US012645633B2

(12) United States Patent
Chellappan et al.

(10) Patent No.: US 12,645,633 B2
(45) Date of Patent: Jun. 2, 2026

(54) HARDWARE AND PROTOCOLS TO SUPPORT IMAGE TRANSFERS OVER MIPI I2C/I3C BUSES

(71) Applicant: Intel Corporation, Santa Clara, CA (US)

(72) Inventors: Satheesh Chellappan, Folsom, CA (US); Haran Thanigasalam, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 34 days.

(21) Appl. No.: 17/680,623

(22) Filed: Feb. 25, 2022

(65) Prior Publication Data

US 2022/0179821 A1     Jun. 9, 2022

(51) Int. Cl.
| | |
|---|---|
| *G06F 13/42* | (2006.01) |
| *G06F 13/24* | (2006.01) |
| *G06F 13/36* | (2006.01) |
| *G06F 13/40* | (2006.01) |

(52) U.S. Cl.
CPC .......... *G06F 13/4282* (2013.01); *G06F 13/24* (2013.01); *G06F 13/36* (2013.01); *G06F 13/40* (2013.01); *G06F 2213/0016* (2013.01)

(58) Field of Classification Search
CPC ...... G06F 13/4282; G06F 13/24; G06F 13/36; G06F 13/40; G06F 2213/0016
See application file for complete search history.

(56) References Cited

U.S. PATENT DOCUMENTS

| | | | | |
|---|---|---|---|---|
| 2017/0359499 | A1* | 12/2017 | Thanigasalam | ...... H04N 23/667 |
| 2017/0374284 | A1* | 12/2017 | Shao | .................... H04N 23/667 |
| 2018/0357199 | A1* | 12/2018 | Mishra | ................ G06F 13/4004 |
| 2021/0026796 | A1* | 1/2021 | Graif | ................... G06F 13/4282 |
| 2021/0127087 | A1* | 4/2021 | Yoshimochi | ............. G06T 7/11 |
| 2021/0360090 | A1* | 11/2021 | Fader | ................... G06F 9/4413 |
| 2022/0060623 | A1* | 2/2022 | Elizov | ................... H04N 23/65 |
| 2022/0276980 | A1* | 9/2022 | Mizutani | ............ G06F 13/4282 |

* cited by examiner

*Primary Examiner* — Henry Tsai
*Assistant Examiner* — Harry Z Wang
(74) *Attorney, Agent, or Firm* — Hanley, Flight & Zimmerman, LLC

(57) ABSTRACT

In one embodiment, a system includes a host system-on-chip (SoC) comprising vision processing circuitry and a camera connected to the host SoC through an Inter-Integrated Circuit (I3C) bus. The camera includes circuitry to generate image data and transmit an interrupt signal to the host SoC over the I3C bus indicating the image data is ready for transfer. The host SoC vision processing circuitry is to transmit a read message to the camera over the I3C bus based on the interrupt signal and receive a set of line payload packets including the image data over the I3C bus based on the read message.

22 Claims, 13 Drawing Sheets

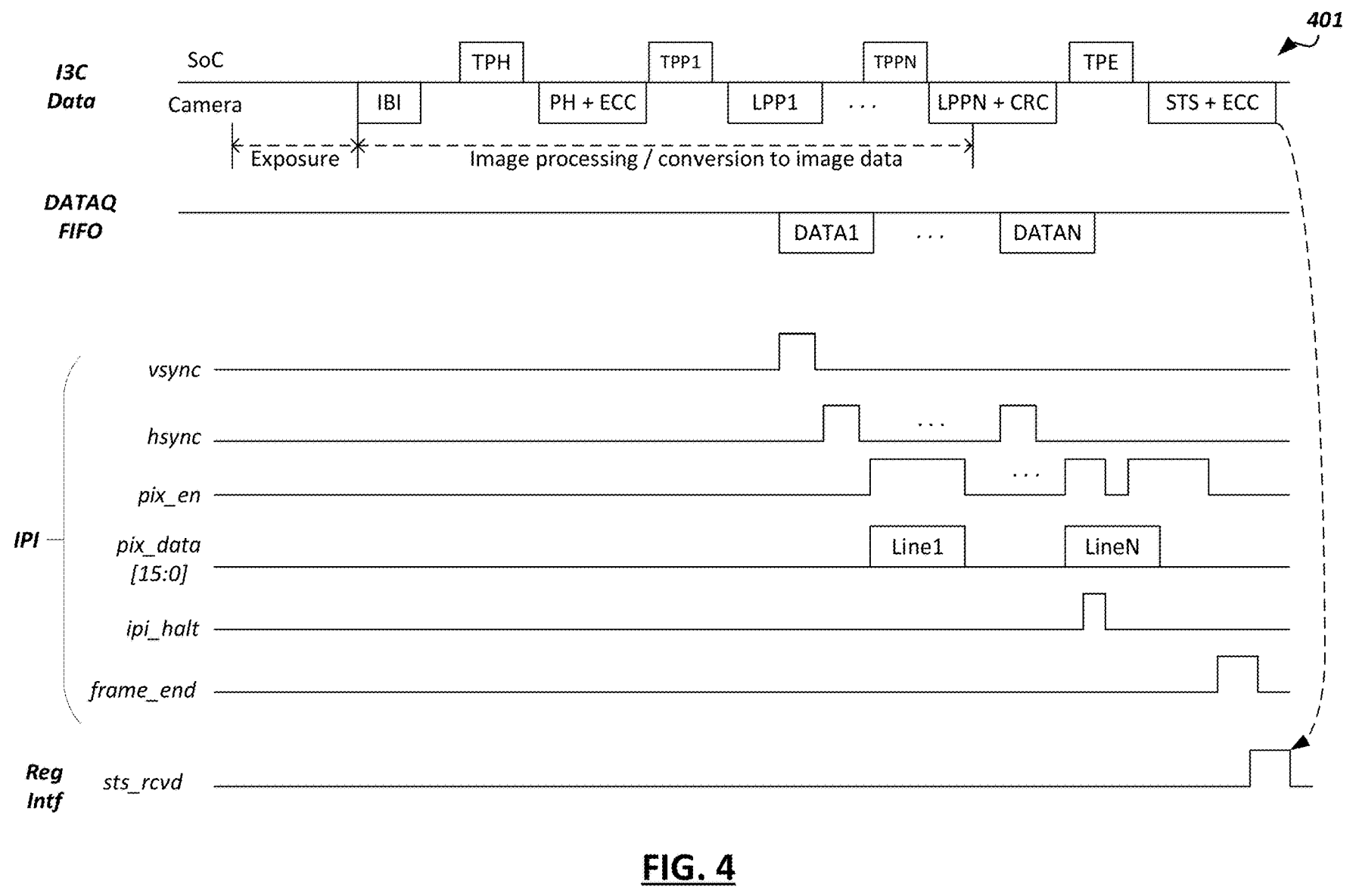

401

SoC

I3C Data

Camera

| Exposure | IBI | TPH | PH + ECC | TPP1 | LPP1 | ... | TPPN | LPPN + CRC | TPE | STS + ECC |

Image processing / conversion to image data

DATAQ FIFO

| DATA1 | ... | DATAN |

IPI vsync hsync pix_en pix_data [15:0]    Line1    LineN ipi_halt frame_end

Reg Intf sts_rcvd

FIG. 4

HARDWARE AND PROTOCOLS TO SUPPORT IMAGE TRANSFERS OVER MIPI I2C/I3C BUSES

TECHNICAL FIELD

This disclosure relates in general to the field of computer systems and, more particularly, to hardware and protocols to support image transfers over MIPI Inter-Integrated Circuit (I2C) and/or improved Inter-Integrated Circuit (I3C) buses.

BACKGROUND

Currently, device cameras (e.g., user facing cameras) utilize high power/high bandwidth interfaces, such as, for example, MIPI Camera Serial Interface 2 (CSI-2) or Universal Serial Bus (USB) interfaces. However, these interfaces may require relatively high levels of power to operate and may accordingly be difficult to implement for low power scenarios, e.g., wake on face (WoF) implementations. In addition, these types of interfaces require high enablement costs and complexities due to the high speed Serializer/Deserializer (SerDes) blocks needed for their implementation.

BRIEF DESCRIPTION OF THE DRAWINGS

FIG. 4 illustrates an example signaling for an I3C data bus and IPI data bus in accordance with embodiments of the present disclosure.

Like reference numbers and designations in the various drawings indicate like elements.

DETAILED DESCRIPTION OF EXAMPLE EMBODIMENTS

Figure 1:
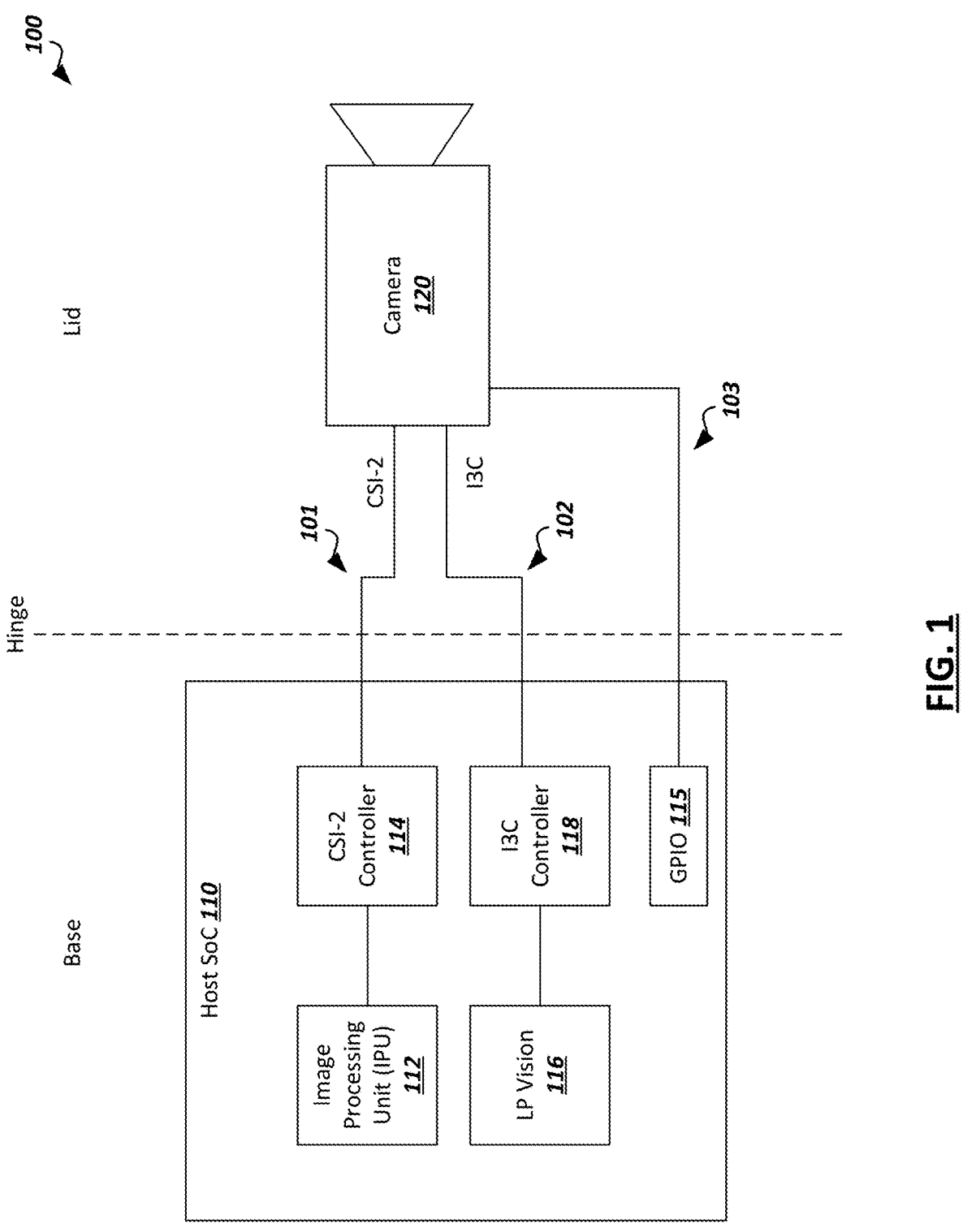
FIG. 1 illustrates an example system implementing image transfer over an I3C bus in accordance with embodiments of the present disclosure.

In the following description, numerous specific details are set forth, such as examples of specific configurations, structures, architectural details, etc. in order to provide a thorough understanding of the present disclosure. It will be apparent, however, to one skilled in the art that these specific details need not be employed to practice embodiments of the present disclosure. In some instances, well known components or methods may be utilized, and such details haven't been described in detail in order to avoid unnecessarily obscuring embodiments of the present disclosure.

Currently, device cameras (e.g., user facing cameras) utilize high power/high bandwidth interfaces, such as, for example, MIPI Camera Serial Interface 2 (CSI-2) or Universal Serial Bus (USB) interfaces. However, these interfaces may require relatively high levels of power to operate and may accordingly be difficult to implement for low power scenarios, e.g., wake on face (WoF) implementations. In addition, these types of interfaces require high enablement costs and complexities due to the high speed Serializer/Deserializer (SerDes) blocks needed for their implementation.

Accordingly, aspects of the present disclosure provide protocols that can allow for the implementation of image data transfers over MIPI Inter-Integrated Circuit (I2C) and/or improved Inter-Integrated Circuit (I3C) buses, which are less complex and require lower power than CSI-2 or USB interfaces. In particular, some embodiments may provide a novel way of mapping existing CSI-2 frame formats and encapsulating them onto I3C packets and provide optimal architectures on both the system on chip (SoC) and camera side by reusing current image processing pipeline. The I3C encapsulation protocol provided herein may be reliable (with error checks and retries) and also scalable for multi-data lane bus in high bandwidth applications. In addition, the protocol sequence also defines scalable I3C read commands to get image frames on a line-by-line basis or a whole frame at a time. Further, some embodiments may include a CRC generator/checker for additional reliability and data integrity. The protocol sequences herein can can also be applied to non-imaging applications, such as, for example, small resolution display frames from an SoC to a display panel (e.g., infotainment or slider bar applications), or to transport sensor data that fits the 25 Mbps per lane bandwidth. Multi-lane (e.g., n×25 Mbps) image data transport may also be supported by aspects of the present disclosure. In some embodiments, an "on-demand" frame request protocol may be used, which may be based on other platform sensors like TOF (time of flight) or ALS (ambient light sensor) from a host SoC sensor hub. The commands and messages may be defined as generic handshake messages for a variety of non-imaging applications like small display, smart-sensors etc.

Furthermore, embodiments herein may provide lower energy usage. As an example, I3C has lower WoF (wake on face) KPI (~8 mW) at the battery as compared with CSI-2 (~20 mW from CVF). Thus, use of the I2C/I3C interfaces may be quite useful for "always on" (AON) implementations or for low cost/low power devices such as Internet of Things (IoT) devices. In some embodiments, the two types of interfaces may be implemented together such that the I2C/I3C interface is used in scenarios where low power operation is desired (e.g., during low power system states) and the CSI-2/USB interface is used otherwise (e.g., for high performance applications, such as streaming of video from the camera).

As an example, aspects of the present disclosure can use an existing I2C/I3C interface in the sensor that may be used for programming, and use the interface for image transport at approximately 25 Mbs per lane in a S0ix system state, and allow for streaming in active S0 system states, on a CSI-2 interface as well as the I3C interface, with full resolution frames being provided on the CSI-2 interface and down-scaled image frames being provided on the I3C interface (e.g., QVGA at 3 fps). For instance, a smart camera can perform motion detection and/or face recognition/detection operations and send only cropped small ROI (region of interest) frames to the SoC over an I3C interface, as such non-periodic asynchronous small image frames are not power efficient to be sent on MIPI CSI-2 or USB. Moreover, in concurrent dual streaming applications, the I3C interface may be used as an offload function, which can allow for I3C-only camera sensors for low cost/low power applications, such as IoT devices.

Further, aspects of the present disclosure provide bridging via hardware that can allow for the use of existing interfaces/pins to implement the image transfers over I2C/I3C, which can save 10 bump costs and eliminate the need to route additional wires (e.g., across a laptop hinge). This may allow for current software drivers to be used (i.e., no new software driver may be needed), as an embedded firmware driver for the bridging hardware controls may only be required. The bridging hardware can provide a layer that is aware of a I3C-PTP (pixel transport protocol) and can seamlessly convert to a pixel interface (PI), which may refer to a type of standard existing interface in AON imaging pipelines, at the output of a CSI-2 controller, that feeds into an image signal processing (ISP) pipeline. This can allow the for a dual camera interface (I3C/CSI-2) to share the same pipeline, either in a mutually exclusive fashion (I3C or CSI-2), or concurrent/single dual interface fashion (I3C and CSI-2). Although much of the disclosure that follows is described with respect to using I3C buses for image transport, it will be understood that aspects of the present disclosure may be used to provide image transport over I2C buses as well using the same or similar techniques as described herein.

FIG. 1 illustrates an example system 100 implementing image transfer over an I3C bus in accordance with embodiments of the present disclosure. The example system 100 includes a host system on chip (SoC) 110 connected to a platform camera 120 via a CSI-2 bus 101 and an I3C bus 102. The platform camera 120 may be a user facing camera, in some embodiments. The I3C bus may be fully compliant with one or more MIPI specifications, and Common Command Codes (CCCs) for I3C-PTP may be allocated by MIPI I3C Working Group (WG). In some embodiments, such as the example shown, the host SoC 110 may be implemented within the base of a laptop computer device while the camera 120 may be implemented in the lid of the laptop computer device. In other embodiments, aspects of the host SoC, such as the CSI-2 controller 114 and/or I3C controller 118, can be implemented in the lid of the laptop computer device and send image signals to image processing units (e.g., 112) implemented within the host SoC.

The host SoC 110 includes an image processing unit (IPU) 112 that is connected to a CSI-2 controller 114, which controls the signaling across the CSI-2 bus 101. The host SoC 110 further includes a low power (LP) vision unit 116 that is connected to an I3C controller 118, which controls the signaling across the I3C bus 102. In the example shown, the camera 120 is able to provide images to the host SoC 110 over either the CSI-2 bus 101 and/or the I3C bus 102. For example, as described above, images needed for motion detection and/or face recognition/detection operations can be sent by the camera over the I3C bus 102, while images for video streaming or other high performance image processing operations can be sent over the CSI-2 bus 101.

In the example shown, the images provided by I3C signals may be converted from serial to parallel and processed by the I3C controller 118, and the I3C packets may be de-encapsulated to extract the image packets. The image packets may include short packets, e.g., for frame headers, and long packets, e.g., for frame line data. Both short and long packets may be checked for field integrity and ECC/CRC checks, e.g., as per specifications.

The host SoC 110 further includes a general purpose input-output (GPIO) controller 115 that controls GPIO signaling across a GPIO bus 103. The GPIO could be implemented with 1.8V or 1.2V, depending on platform the host SoC resides on and/or camera support.

The configuration of the example system 100 may be modified in other embodiments. For instance, in some embodiments, the camera 120 may include a USB bridge chip that provides a CSI-2 to USB bus bridge, and connects the camera 120 to the host SoC 110 over a USB bus. In such instances, the high performance image streaming may take place over the bridged connection and the camera 120 may separately implement an I3C interface to provide images to the host SoC 110 as shown in FIG. 1. As another example, the camera 120 may be connected to the host SoC 110 only via an I3C bus, and may provide all of its images over the I3C bus connection. Further, the system 100 may include additional, fewer, or other components than those shown or described above.

Figure 2:
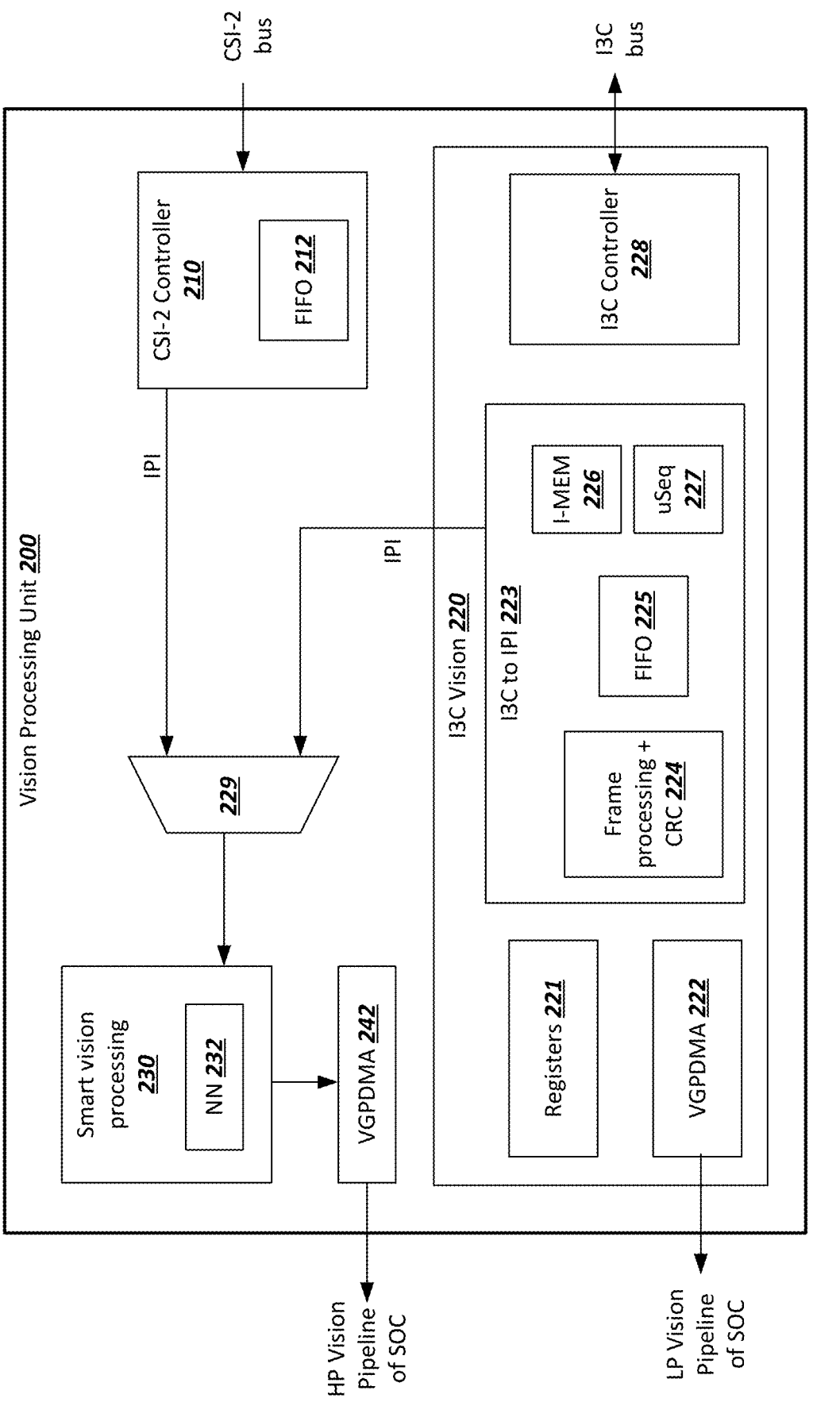
FIG. 2 illustrates an example vision processing unit in accordance with embodiments of the present disclosure.

FIG. 2 illustrates an example vision processing unit 200 in accordance with embodiments of the present disclosure. In certain embodiments, the example vision processing unit 200 may be implemented in a host SoC similar to the host SoC 110 of FIG. 1. The example vision processing unit 200 includes a CSI-2 controller 210 with a first-in/first-out (FIFO) buffer 212 connected to a CSI-2 bus (e.g., 101). The CSI-2 controller 210 may be implemented in the same or similar manner as the CSI-2 controller 114 of FIG. 1, and the FIFIO 212 may be used to buffer incoming images from a camera (e.g., the camera 120 of FIG. 1). As shown, the CSI-2 controller 210 may be responsible for converting the CSI-2 data payloads to an image pixel interface (IPI) that is provided to a multiplexer 229.

The vision processing unit 200 also includes an I3C vision unit 220 connected to an I3C bus. The I3C vision unit 220 includes an I3C controller 228, which may be implemented in the same or similar manner as the I3C controller 118 of FIG. 1. The vision processing unit 200 also includes I3C to IPI circuitry 223, which includes frame processing and CRC checking circuitry 224, a FIFO 225, instruction memory (1-MEM) circuitry 226, and micro-sequencer (uSeq) circuitry 227. In some embodiments, the clock conversion from the I3C controller parallel clock can happen either in the I3C controller 118 or in the FIFO 225. Based on the low power requirements of I3C, the bridge layer provided by the I3C to IPI circuitry 223 may be fully compliant with all pixel/frame types defined by MIPI CSI-2 specifications, e.g., RAW 6, RAW7, etc. In some instances, the bridge layer can be in a separate power domain (PD). and may look for wake event messages from a camera before power ungate an AON image pipeline to process the incoming image frames. The FIFO 225 may handle any temporary throttling from the image pipeline (e.g., a halt signal condition) and may provide streamlined pixel transfer from I3C to the AON image pipeline.

The frame processing and CRC checking circuitry 224 may be responsible for converting the I3C data payload (e.g., 8/16/32 bits) to 1 pixel per clock (e.g., 6,7,8,10, 12 etc. bits) at the image pixel interface (IPI) that is provided to the multiplexer 229. The instruction memory circuitry 226, where the CPU or DSP Host load one or more instruction at initialization for image transport. The micro-sequencer circuitry 227 may fetch and process instructions and achieve a set of operations needed for image transport. The I3C controller 228 may include a master access port (e.g., OCP or AXI/AHB) driven by the micro-sequencer circuitry 227 to access registers of the I3C controller 228 and/or other specific registers in the host SoC. The registers 221 include one or more registers for control and status operations, including interrupts to be provided to the host SoC. The vision general purpose direct memory access (VGPDMA) block 222 may provide a way to move image data from the FIFO 225 to system memory (e.g., SRAM or DDR) for direct host SoC image frame processing (direct image processing may be more common when the camera has built-in ISP). In the example shown, the VGPDMA 222 provides its output to a low power (LP) vision pipeline of a host SoC. In some embodiments, in low power (LP) operation, the I3C bus can operate at a max of 25 Mbps per lane (1 bit serial) and the pixel clock can run in a typical range, e.g., 100 Mhz (e.g., 8 bit parallel for RAW8), and can perform race to halt processing to save power.

As shown, the IPI data from each of the CSI-2 controller 210 and the I2C vision unit 220 is provided to the multiplexer 229, which outputs one of the IPI data streams to a smart vision processing unit 230 that includes at least one neural network (NN) 232 to provide image processing and/or analysis, e.g., face detection, motion detection, etc. The smart vision processing unit 230 outputs to a VGPDMA 242, which can operate similar to the VGPDMA 222 and provide its output to a high power/high performance (HP) vision pipeline of the host SoC.

The configuration of the example vision processing unit 200 may be modified in other embodiments. For instance, the vision processing unit 200 may include additional, fewer, or other components than those shown or described above.

Figure 3:
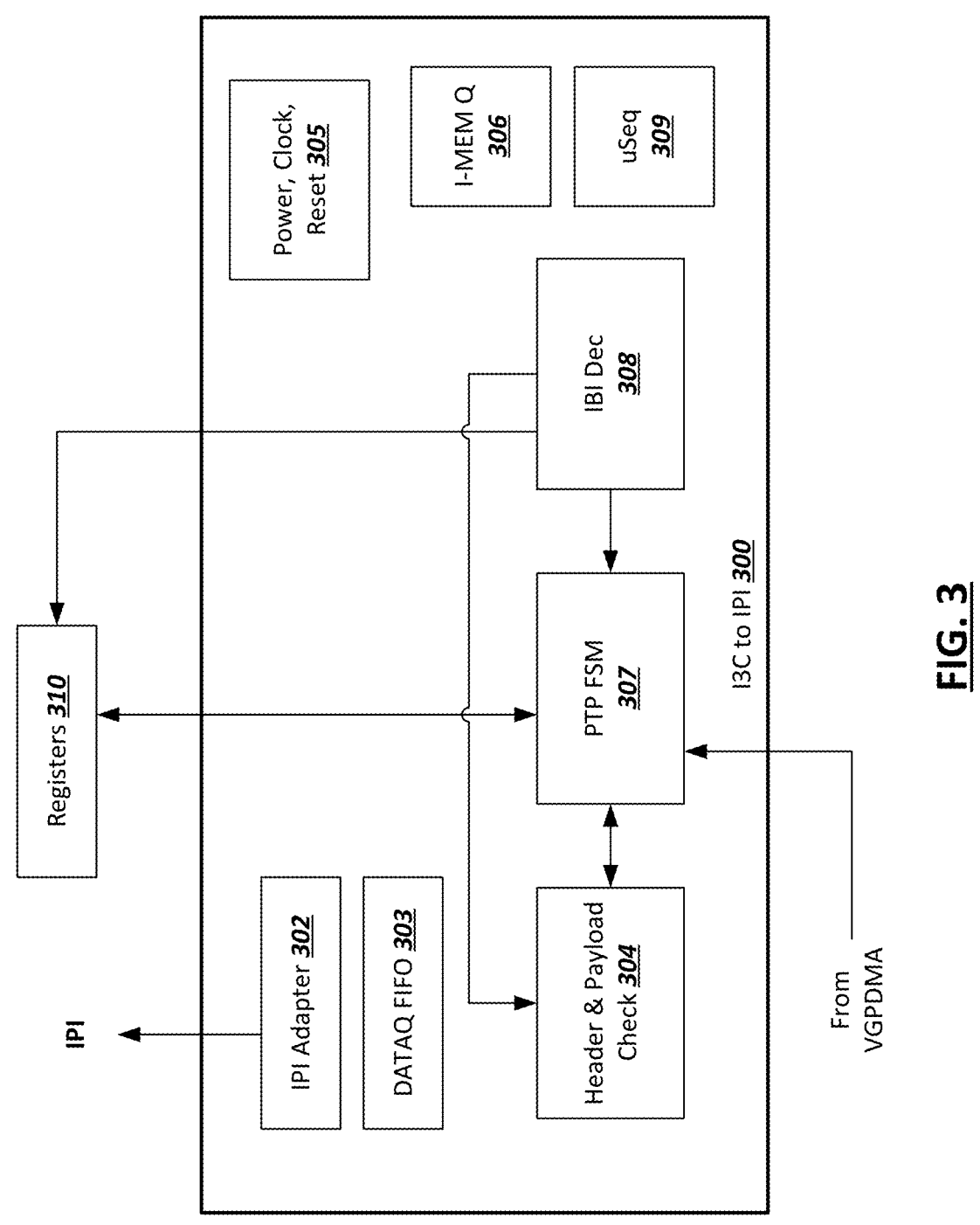
FIG. 3 illustrates example I3C to IPI circuitry in accordance with embodiments of the present disclosure.

FIG. 3 illustrates example I3C to IPI circuitry 300 in accordance with embodiments of the present disclosure. The example I3C to IPI circuitry 300 may be implemented in any of the above examples, e.g., within I3C to IPI circuitry 223 of a host SoC, e.g., host SoC 110. In the example shown, the I3C to IPI circuitry 300 includes an IPI adapter 302 to provide an IPI output, e.g., as shown in FIG. 2, and a DATAQ FIFO 303 to hold image data. The I3C to IPI circuitry 300 also includes Header and Payload Check circuitry 304 that performs checks on the I3C header and payload data. The I3C to IPI circuitry 300 further includes power, clock, reset circuitry 305 that handles power gate/ungate requests based on wake events or instructions from a host SoC. In addition, it may handle the clock request/acknowledgements to save power, e.g., to gate the clock during the 333 ms for 3 FPS (frames per sec) operation. Further, it may provide a reset function that handles the power on and host SoC-initiated resets, and can manage one or more downstream units in the I3C to IPI circuitry 300, e.g., the I3C master controller.

The I3C to IPI circuitry 300 further includes IBI Dec circuitry 308 that provides wake detection operations, e.g., looking for wake message from a smart camera with a built-in motion detector. The I3C to IPI circuitry 300 further includes Pixel Transport Protocol (PTP) Finite State Machine (FSM) 307 that sequences the pixel transport specification. For instance, the PTP FSM 307 may handle and check protocol stages and follow the expected sequencing for incoming image frames. The state machine may start fresh for every new image frame coming in, and if there is an unexpected sequence, then an error can be detected and reported. The I3C to IPI circuitry 300 further includes an I-MEM 306 and uSeq circuitry 309 that are each implemented similar to the I-MEM 226 and uSeq 227 of FIG. 2. The registers 310 may be a firmware- or software-accessible Configuration, Control, and Status register pertaining to such functions. The firmware or software can initialize these registers based on platform requirements (e.g., with camera settings), read the status registers on error interrupt, or on debug.

The configuration of the example I3C to IPI circuitry 300 may be modified in other embodiments. For instance, the I3C to IPI circuitry 300 may include additional, fewer, or other components than those shown or described above.

FIG. 4 illustrates an example signaling for an I3C data bus and IPI data bus in accordance with embodiments of the present disclosure. The example I3C data bus signaling 401 illustrates signaling on the I3C bus (e.g., 102) between a host SoC (e.g., 110 of FIG. 1) and a camera (e.g., 120 of FIG. 1). In the example shown, the camera collects data via sensor exposure and sends an In-Band Interrupt (IBI) signal to the host SoC while it continues to convert the sensed image to image data/packets. The IBI may indicate to the camera that a frame is ready for sending. In some embodiments, the camera may queue line data in a FIFO of the camera, and when sufficient line data is available in the FIFO, the camera may send the IBI message.

In response to the IBI, the host SoC sends a transmit packet header (TPH) message back to the camera, which functions as a read signal. The TPH message may be defined per Table 1 below, and may be a type of I3C read command to allow the SoC to read the image frame header from the camera. The camera responds to the TPH message by providing a packet header (PH) and error correcting code(s) (ECC). The packet header may be formatted in the same manner as provided in CSI-2 specifications. Further, the packet header may be protected by ECC in the same manner as provided in CSI-2 specifications.

Next, the host SoC sends a (transmit packet payload) TPP message (e.g., as defined per Table 1 below), which also functions as a read signal, and in response, the camera begins to send line payload packets (LPP) that each include data corresponding to a line of image data. Each line of image data may, for example, include 320 columns×240 rows of pixel data. As shown, a DATAQ FIFO (e.g., 225 or 303) may be filled with the line packet data, with DATA1 corresponding to LPP1, etc. In some embodiments, cyclic redundancy check (CRC) values (e.g., CRC16) are included at the end of a whole frame with a single TPP messages. The generated CRC16 for the whole frame will be sent at end of the frame as shown in FIG. 4. In some embodiments, frame data is transferred per line with separate TPP messages and a CRC value may be included only on last TPP command. In yet other embodiments, LPPs may be transferred in a contiguous fashion without error correction provided on the packet payloads.

After the LPPs are sent across the I3C bus, the host SoC then sends a transmit packet end (TPE) message requesting a frame status. The TPE may be formatted per Table 1 below. In response, the camera may send a status (STS) message with error correcting code(s). The status message may be protected by ECC in the same manner as provided in CSI-2 specifications. After this, the camera may optionally go into low power mode and save power until next periodic interval.

As shown, the example image streaming protocol may allow for the use of I3C specification-defined private read messages and may thus enhance the commands with CCC (common command codes) and optimally map to various packet defined by CSI-2 image frame format. An example CCC definition is shown below in Table 1. However, in some embodiments, the CCC definition may be negotiated between agents. It will be understood that the CCC & DB encoding below may be for an I3C pixel transport protocol (PTP) as described here, but can be similar or different for other image or data transfer applications such as with displays or other platform sensors.

TABLE 1

| CCC Code | 0xC0<br>New code assigned for I3C-PTP | |
|---|---|---|
| Defining Byte | 0x00 Reserved | |
| | 0x01 TPP (transmit packet payload) | SDR/DDR |
| | 0x02 DPF (discard present frame) | SDR |
| | 0x03 ODF (on demand frame) | SDR/DDR |
| | 0x04 TPH (transmit packet header) ** | SDR/DDR |
| | 0x05 RPH (replay packet header) ** | SDR/DDR |
| | 0x06 TPE (transmit packet end) ** | SDR/DDR |
| | Others Reserved | |
| Sensor (SNS)<br>Address | <sns addr> | |

Table 2 below shows example instruction bits for use with the example signaling shown in FIG. 4. The example instruction bits may be handled by the uSeq circuitries described above with respect to FIGS. 2-3.

TABLE 2

| Bits | Description |
|---|---|
| For uSeq<br>[33:32] | Instruction Format<br>[33]: 0 - APB Write instruction<br>   [32]: 0 - Write bits[31:0] to<br>   command port<br>   [32]: 1 - Write bits[31:0] to data<br>   port<br>[33]: 1 - uSeq instruction<br>   [32]: Unused |
| For uSeq<br>[31:28] | Opcode (when bit[33] = 1)<br>0000 - Repeat loop<br>0001 - Delay loop<br>1110 - End of instruction with camera<br>sleep mode<br>1111 - End of instruction<br>Others - Reserved |
| For uSeq [27:20] | Loop count (when bit[33] = 1) |
| For uSeq [19:8] | Reserved (when bit[33] = 1) |
| For uSeq [7:0] | Number of instruction to be looped<br>(when bit[33] = 1) |

Figure 5:
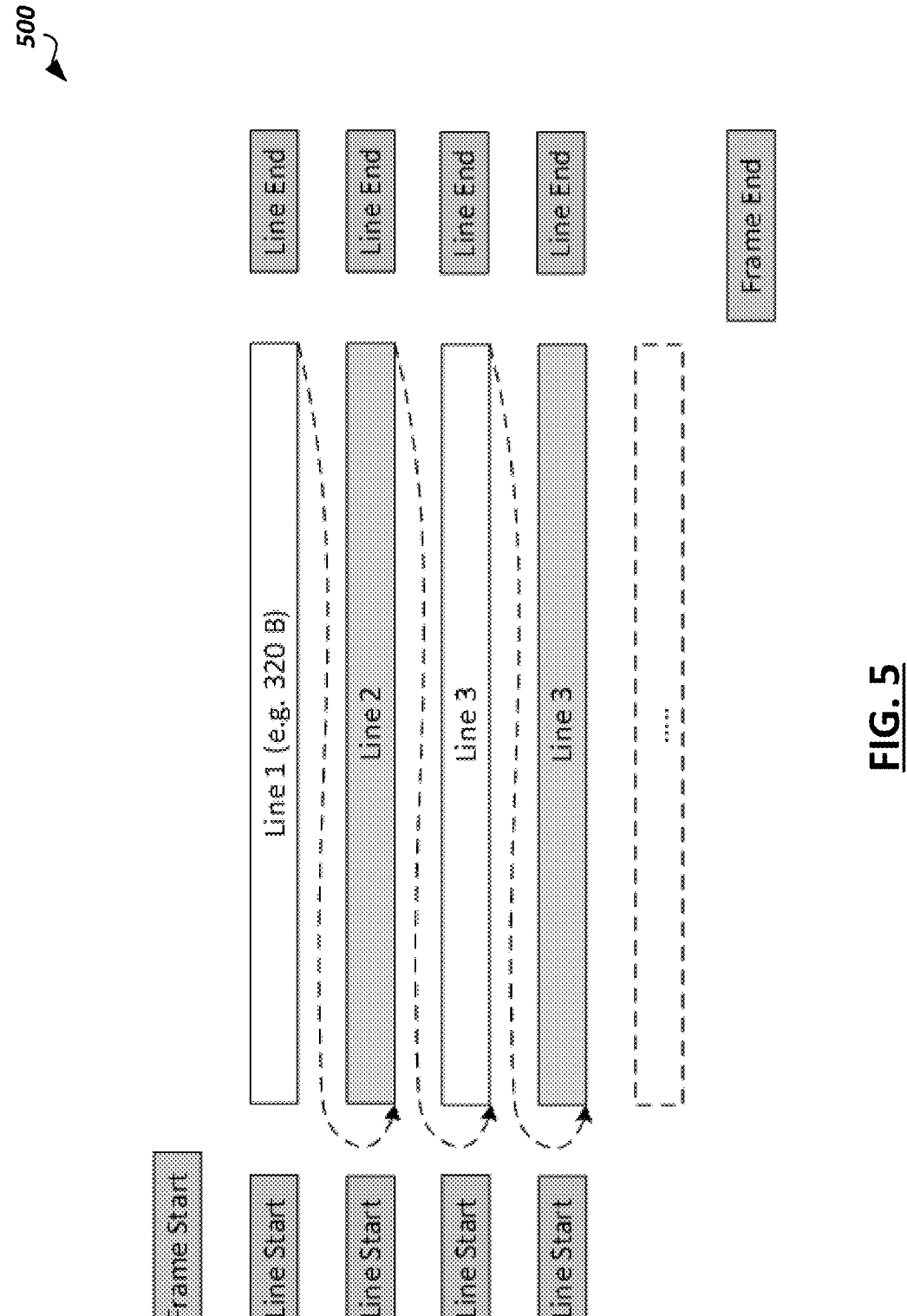
FIG. 5 illustrates an example image formatting and transport in accordance with embodiments of the present disclosure.

FIG. 5 illustrates an example image formatting and transport in accordance with embodiments of the present disclosure. As shown, short packets may include image frame markers. The "Frame Start/End" packets may be treated as mandatory in certain embodiments, while the "Line Start/End" packets may be optional in certain embodiments (e.g., because a frame level CRC may be added in certain instances for data integrity checks and any frame number requirement can be satisfied by sending through the IBI message described above). The long packets shown are the image line pixel data described above. In some embodiments, each of the short packets shown might be omitted from being sent across the I3C bus and may be recreated at the host SoC for use by the rest of the imaging pipeline. In many example use cases, the short packets can treated optional and the frame number might not be used, while in other use cases (e.g., secure applications), a frame number may be needed/used to catch replay attacks.

Figure 6:
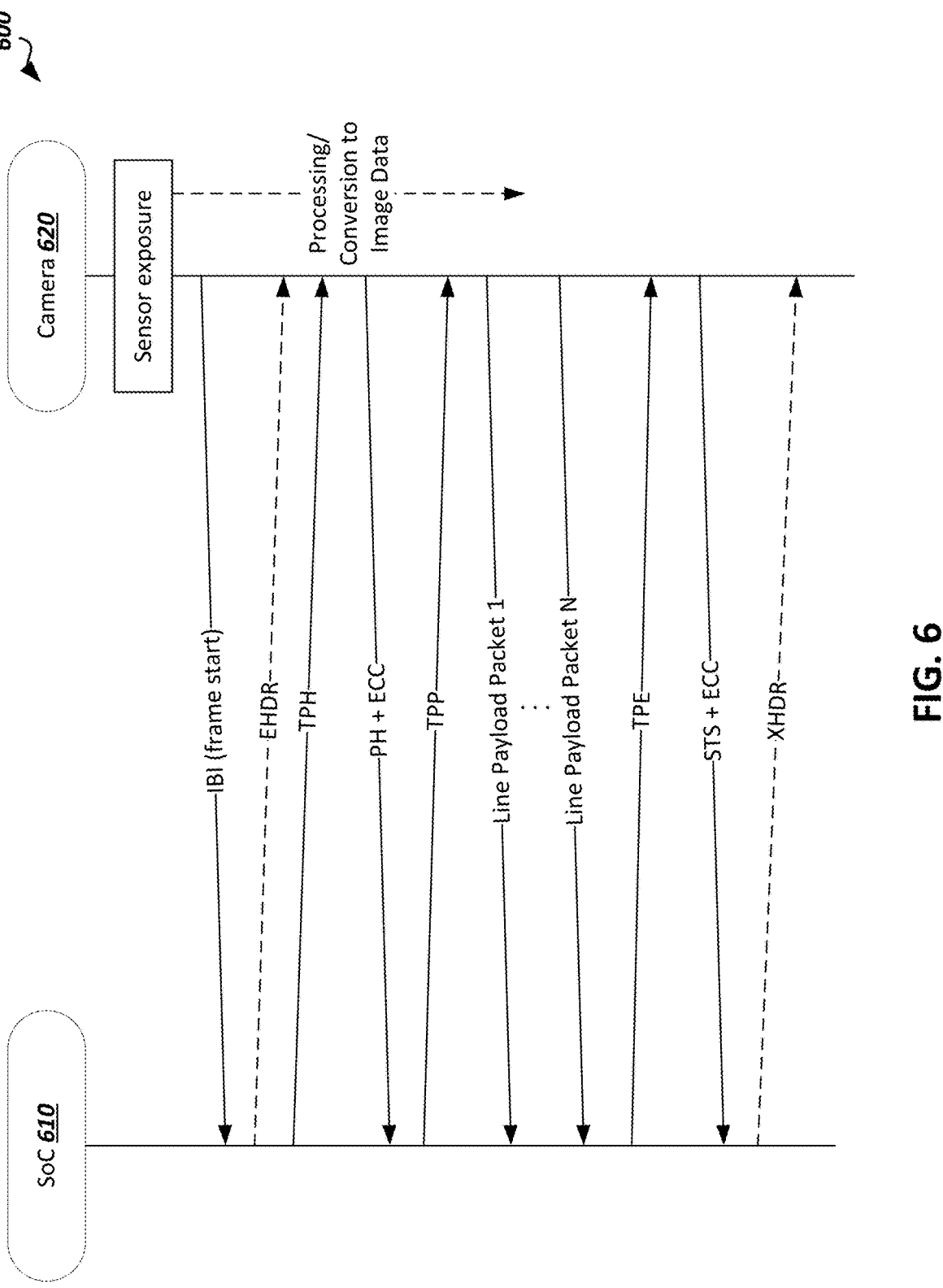
FIG. 6 illustrates an example signaling diagram for a camera-managed image transport in accordance with embodiments of the present disclosure.

FIG. 6 illustrates an example signaling diagram 600 for a camera-managed image transport in accordance with embodiments of the present disclosure. In the example shown, the camera 620 may maintain a sensor exposure period or time interval, e.g., 33 ms for 30 FPS operation. When the inter-frame gap (IFG) is about to expire, the camera may pre-wake and enable its sensor exposure time per the configuration. For example, a low light scenario will have longer exposure time, e.g., 30 ms, while a bright lit room will have a shorter exposure time. For instance, during the IFG, such as when (IFG time–Exposure time) has elapsed, the camera wakes up and start the pixel array exposure. When the exposure time is finished, the camera 620 sends an IBI to the host SoC 610 with data indicating the start of frame data (e.g., message code="Frame Start"). The SoC 610, in some embodiments, may enter into a high data rate (HDR) mode and send an Enter HDR (EHDR) message as shown to get up to 25 Mbps per data lane. Otherwise, the image data transfer will take place in single data rate (SDR) mode at 12.5 Mbps. The EHDR packets may mark the mode/speed of the I3C bus; by default, the I3C bus typically stays in I2C mode (i.e., low bandwidth<=12 Mbps), and need to send the EHDR (and XHDR) packets to communicate the I3C mode (i.e., 25 Mbps) delimiters.

The SoC 610 sends a TPH message as described above. In some instances, the TPH can include CCC=0xC0 and DB=0x04 per Table 1 above. The camera 620 sends a packet header (PH) and error correcting code(s) (ECC) as described above, and thereafter, the SoC 610 sends a TPP message to read the whole frame. In the example shown, the TPP indicates a line-by-line transfer. The TPP message may have CCC=0xC0 and DB=0x01 per Table 1 above. In response to the TPP message, the camera 620 sends LPPs that include the line-by-line data. Thereafter, the SoC 610 ends the image transfer by sending a TPE message as described above. The TPE may request the status for the image frame, which is sent by the camera 620 along with error correcting code(s). The TPE may include CCC=0xC0 and DB=0x06 per Table 1 above. Where an EHDR is sent by the SoC 610 initially for HDR transfers, the SoC 610 will also send an Exit HDR (XHDR) message to indicate the camera sensor may go to sleep.

Figure 7:
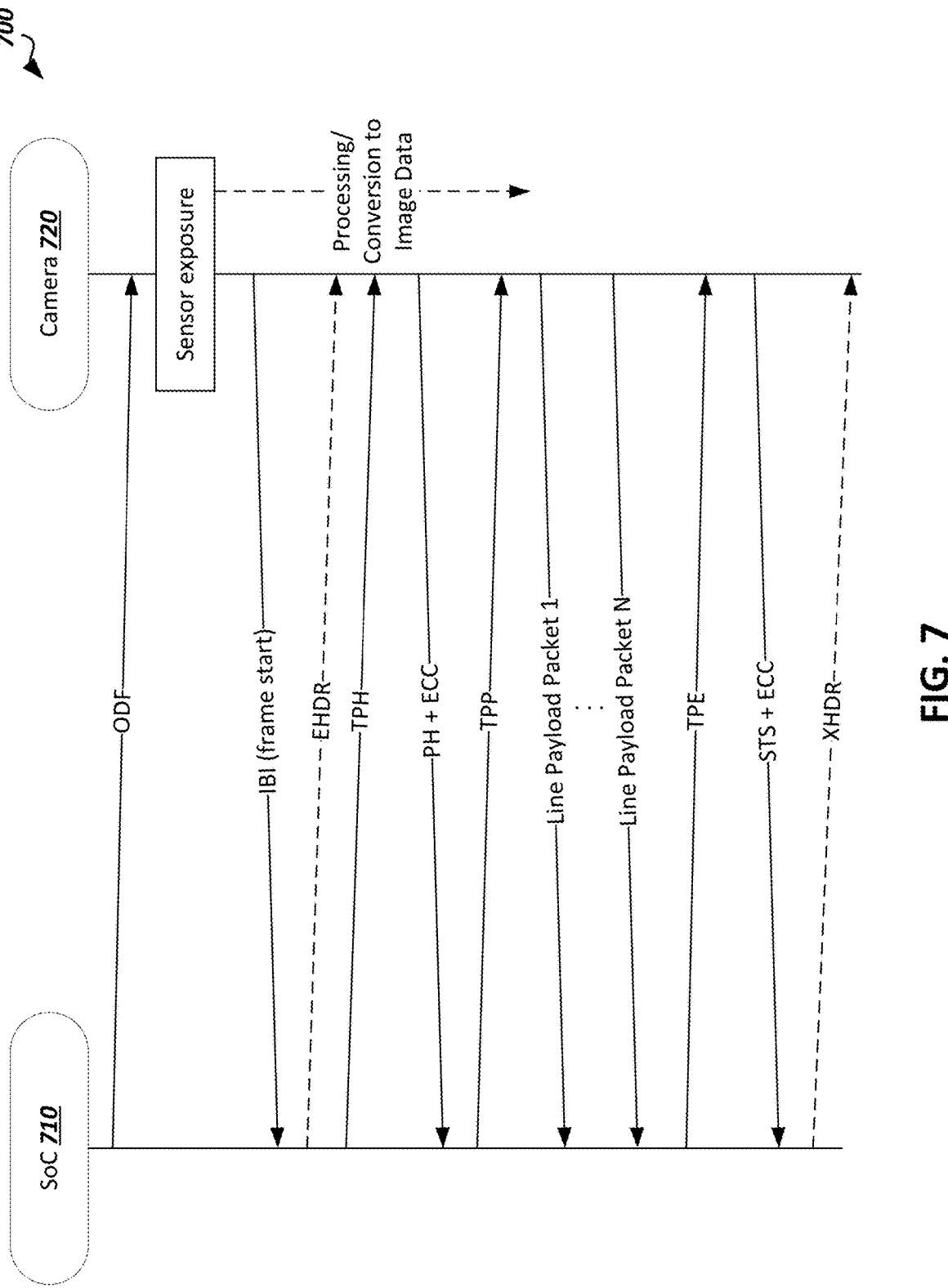
FIG. 7 illustrates an example signaling diagram for an SoC-managed image transport in accordance with embodiments of the present disclosure.

FIG. 7 illustrates an example signaling diagram 700 for an SoC-managed image transport in accordance with embodiments of the present disclosure. The example signaling shown may implement an "on-demand" mode of frame capture, which may be beneficial for ultra low-power use cases, e.g., where other platform sensors can augment as pre-wake before enabling the camera for streaming and save camera and processing power. This can allow the SoC to manage the FPS dynamically (e.g., using a mix of 3 FPS, 30 FPS, etc.), or asynchronously polling the camera for image frames based on other events. The SoC may thus have the option to maintain an on-demand frame rate or manage dynamically-changing FPS based on the application.

In this mode of operation, when the SoC 710 SoC is ready to get an image capture from the camera 720, it sends an on-demand frame (ODF) message, which may include CCC=0xC0 and DB=0x03 per Table 1 above. The ODF may function as an I3C read command to read an image frame header from the camera 720. The ODF message may then become the frame timer tick for the camera sensor, which starts its exposure time. The image data may then be transferred from the camera 720 to the SoC 710 as described above with respect to FIG. 6.

Figure 8:
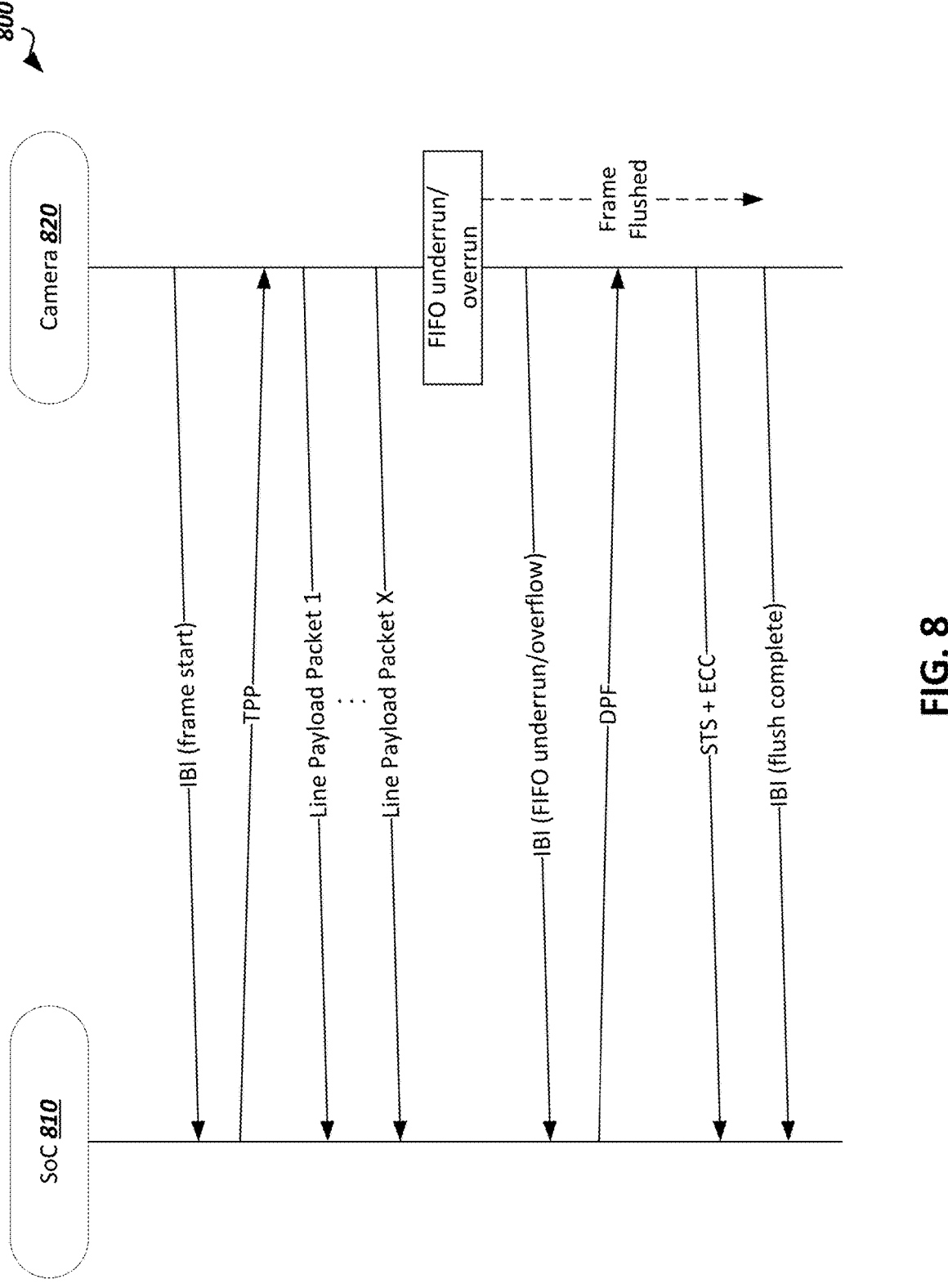
FIG. 8 illustrates an example FIFO underrun/overflow flush scenario in accordance with embodiments of the present disclosure.

The following describes example error handling scenarios and abort conditions. Referring first to FIG. 8, an example FIFO underrun/overflow flush scenario in accordance with embodiments of the present disclosure is illustrated. In the example shown, during the transfer of LPPs as described above, a FIFO underrun or overflow occurs at the camera 820, and the camera 820 sends an IBI message indicating the underrun/overflow, and the SoC 810 sends a flush command (DPF) with CCC=0xC0 and DB=0x02 per Table 1 above.

The underrun condition may not be common when the system clocking architecture is optimal. There are some cases where the clocks could drift within the camera sensor, between the I3C bus clock and the imaging clock causing an underrun condition, when I3C bus clock is faster than the rate at which pixels are produced. The overflow condition, on the other hand, is a fatal condition and mostly, the pixels are lost. This is not common when the system clocking architecture is optimal. There are some cases where the clocks could drift within the camera sensor, between the I3C bus clock and the imaging clock causing an overflow condition, when I3C bus clock is slower than the rate at which pixels are produced and the internal FIFO inside the camera will overflow.

Figure 9:
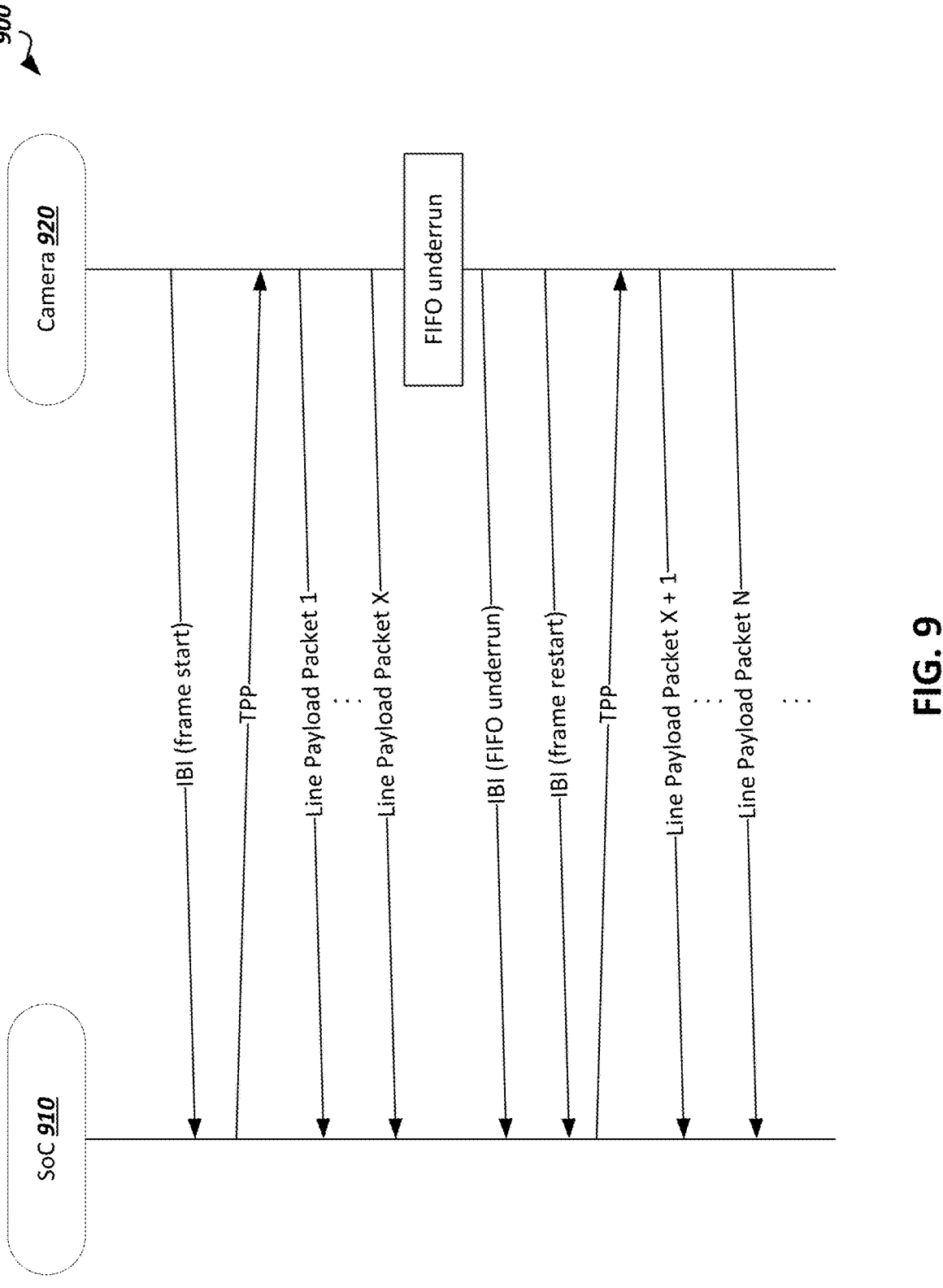
FIG. 9 illustrates an example underrun retry scenario in accordance with embodiments of the present disclosure.

Referring next to FIG. 9, an example underrun retry scenario in accordance with embodiments of the present disclosure is illustrated. In the example shown, after a FIFO underrun, the camera 920 will send an IBI message indicating the underrun condition as in FIG. 8, but then later sends an IBI message indicating a restart of the frame data transfer. The SoC 910 does not perform any operation and the sensor continues the image transfer after sending the IBI restart message. This retry scenario may be useful for more secure use cases, where an application cannot afford to lose a current frame, and the application must wait to get the remaining data.

Figure 10:
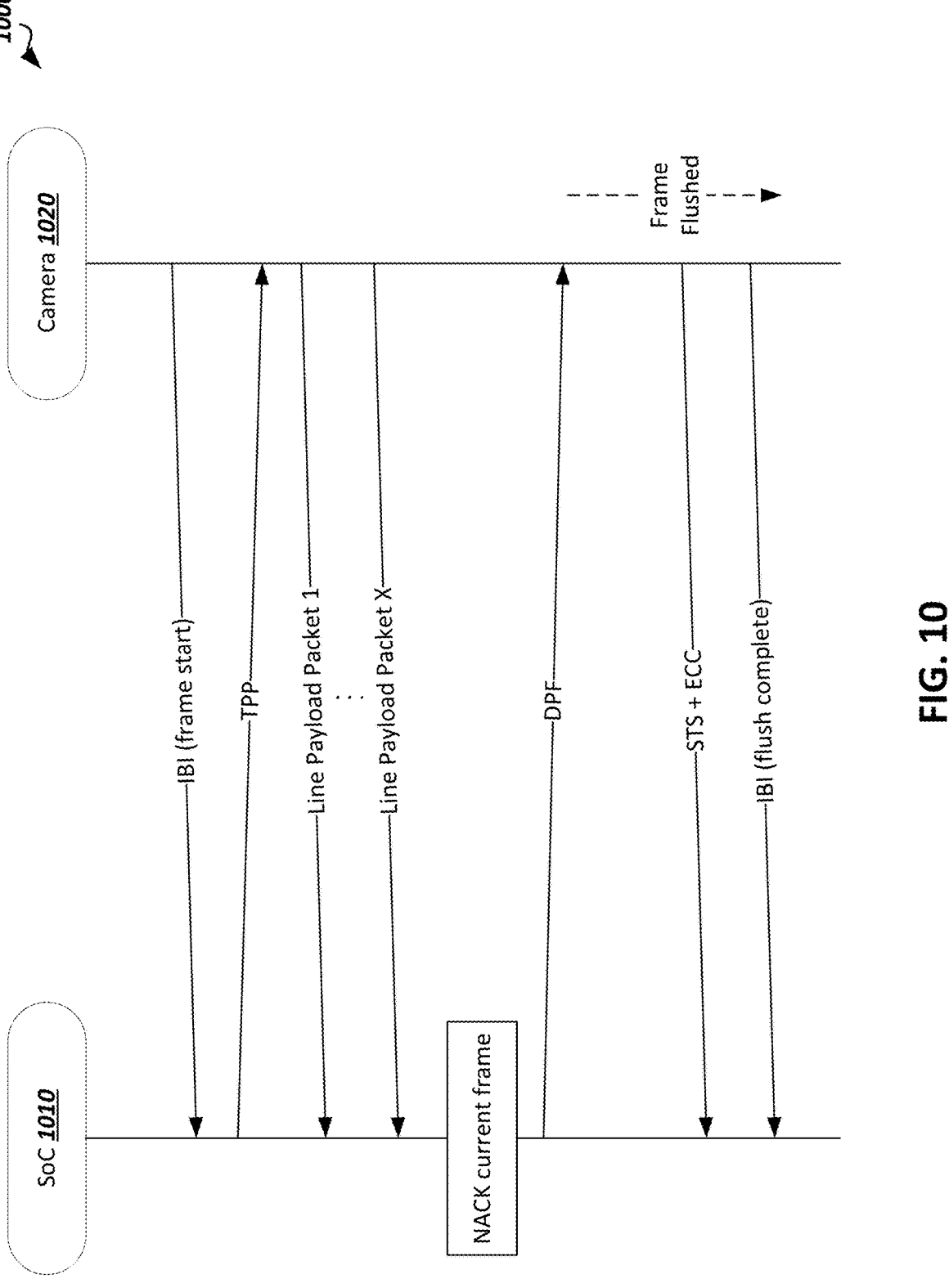
FIG. 10 illustrates an example abort scenario in accordance with embodiments of the present disclosure.

Referring next to FIG. 10, an example abort scenario in accordance with embodiments of the present disclosure is illustrated. In certain conditions (e.g., a reset or for fast re-capture), the SoC 1010 may determine to abort and drop a current frame, e.g., for latency reasons. In this case, the SoC 1010 will NACK the current frame read, and will send a DPF command with CCC=0xC0 and DB=0x02 per Table 1. The camera 1020 then flushes the frame in response to the DPF message once can send an IBI message indicating a completed flush back to the SoC 1010.

It will be understood that aspects of the present disclosure may be independent of I3C bus speed or HDR (high data rate) modes like BPT, Ternary etc. and may be independent of multi-data lane for higher bandwidth applications, applying to low or high bandwidth applications. Additionally, example event message encodings and the CCC and DB encodings described herein can be defined in another manner, e.g., per usage. Further, aspects herein may be independent of other concurrent streaming from camera sensors, e.g., with concurrent MIPI CSI-2 streaming for full-definition image frame transfers. In some embodiments, the camera sensor programming can share the same I3C-PTP bus or can have a dedicated I2C/I3C bus. One example camera sensor configuration to be used with embodiments herein may have an Image Frame Size QVGA (320×240), pixel format of Bayer RAW (monochrome or green-only), bits per pixel of 8 bits or lower, FPS of 3, and an I3C bus clock at 12.5 MHz DDR (25 Mbps bandwidth per lane).

Figures 11A, 11B:
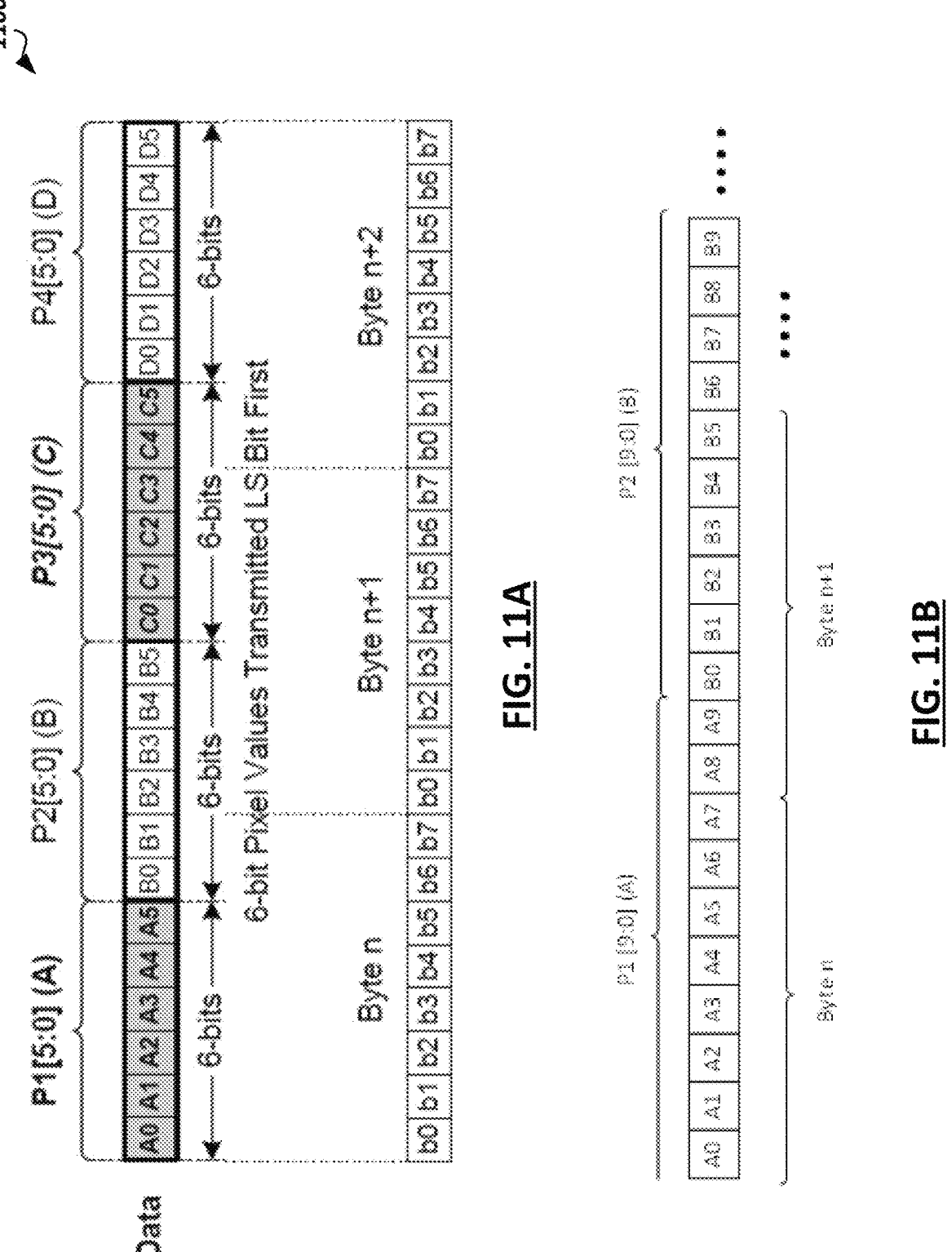
FIGS. 11A-11B illustrate example packet payload formats in accordance with embodiments of the present disclosure.

The TPH, the TPP, and TPE messages within the I3C payload may follow the CSI-2 bit ordering rules with a least significant bit (LSB) sent on the bus first. The ECC field may be sent last within the TPH, TPE, and DPF packets. For TPP based on a pixel type, the pixels may be transmitted contiguously, e.g., for RAW7 per MIPI CSI-2 protocol. Where one TPP message is used for a whole frame (e.g. 76.8 KPixels), the I3C LPP may be padded to word (16b) alignment for SDR/HDR mode. Where one TPP is used per row line (e.g., QVGA frame=320 pixels per line×240 lines), 240 I3C LPPs may be needed to obtain an entire frame. Each pixel can be initialized to send 8bits, 7bits, or 6bits, e.g., with RAW7 bits is =320×7/8=280 Bytes. The I3C LPPs may be padded to word (16b) alignment for SDR/HDR mode. If CRC16 is enabled, 2 bytes may be added at the end of the image frame data, with LSB the bit[0] of CRC16 being sent first on the line (as shown in FIGS. 11A-11B). Also, any word alignment (16b) may be applied to the packet boundary by inserting padding of 0's. If there are multiple TPP's for an image frame, the CRC16 may include all the TPPs and the padding.

FIGS. 11A-11B illustrate example packet payload formats in accordance with embodiments of the present disclosure. In particular, FIG. 11A illustrates an example RAW6 data transmission and FIG. 11B illustrates an example data transmission for RAW10 data. As shown in FIG. 11B, for RAW10 and higher formats, the pixel data are packed contiguously to match the pixel data at the output of the CSI-2 layer, to satisfy the higher layer requirements.

Table 3 below shows example packet header formatting according to at least one embodiment.

TABLE 3

| Num of bits | Field | Description |
|---|---|---|
| 8-bit | DATA IDENTIFIER (DI): | Contains the 2-bit Virtual Channel (VC) and the 6-bit Data Type (DT) Information. VC (bits 7:6) is the least significant two bits of the 4-bit Virtual Channel Identifier for the D-PHY physical layer option. DT (bits 5:0) denotes the format/content of the Application Specific Payload Data (used by the application specific layer). |
| 16-bit | WORD COUNT (WC): | The receiver reads the next WC data words independent of their values. The receiver is NOT looking for any embedded sync sequences within the payload data. The receiver uses the WC value to determine the end of the Packet Payload. Note: In some embodiments, the CSI-2 definition of this field is not used in I3C image transers, as the byte count may be pre-negotiated between an SoC and camera based on the frame size and format. For example, for qVGA with RAW8 frame the byte count may be negotiated as 76.8 KB between the SoC and camera. The max read length configuration in I3C could be "unlimited bytes" for a full qVGA frame with 76.8 Kpixels, or could be 320 pixels, which is the number of line pixels for qVGA. |
| 8-bit | ECC + VCX | 6-bit Error Correction Code (ECC) + 2-bit Virtual Channel Extension (VCX): ECC (bits 5:0) enables 1-bit errors within the packet header to be corrected and 2-bit errors to be detected. VCX (bits 7:6) is the most significant two bits of the 4-bit Virtual Channel Identifier for the D-PHY physical layer option. |

Figure 12:
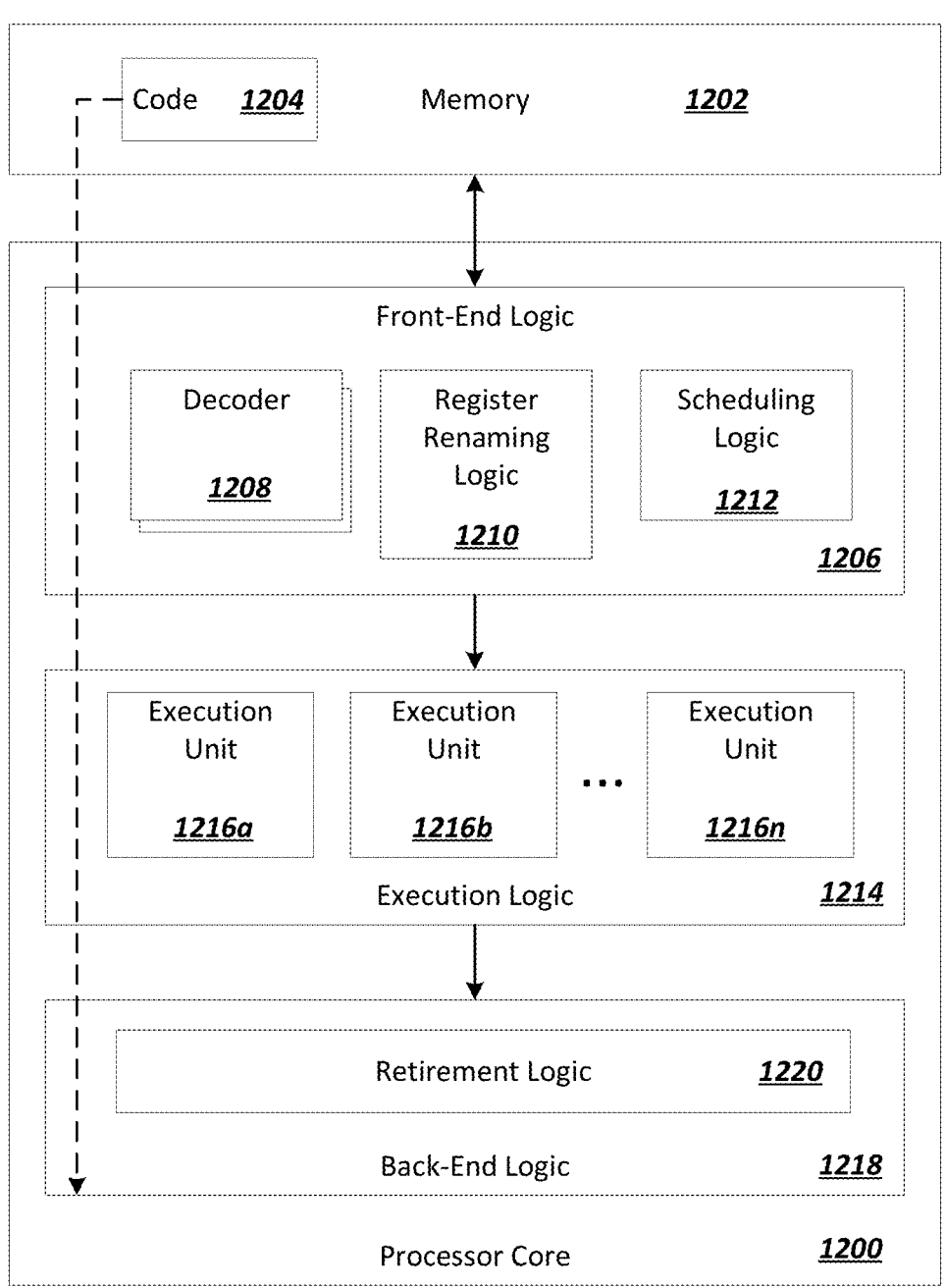
FIG. 12 is an example illustration of a processor according to an embodiment.
Figure 13:
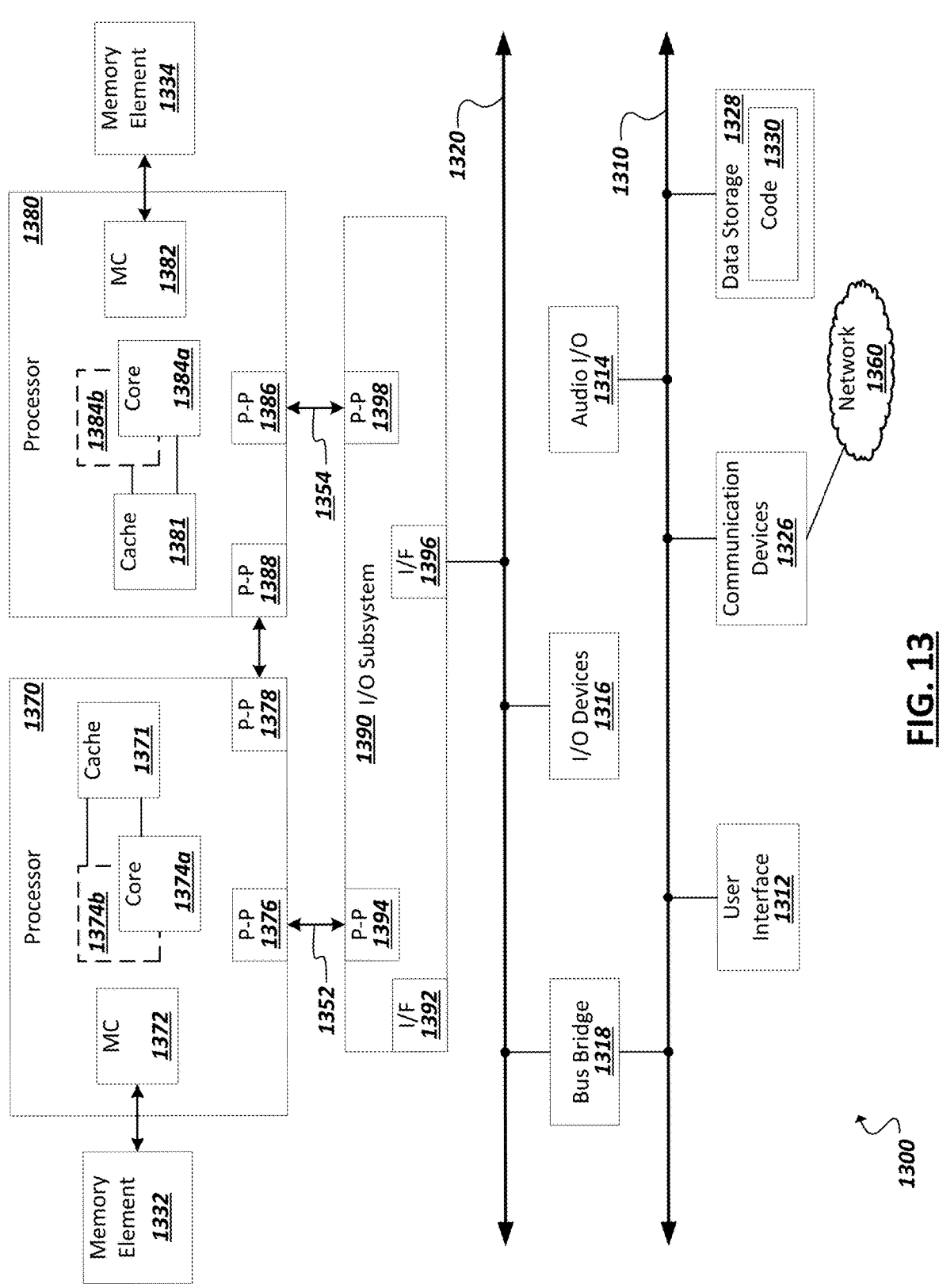
FIG. 13 illustrates a computing system that is arranged in a point-to-point (PtP) configuration according to an embodiment.

FIGS. 12-13 are block diagrams of example computer architectures that may be used in embodiments disclosed herein. For example, in some embodiments, a computer system may contain one or more aspects shown in FIGS. 12-13 and may implement one or more aspects of the present disclosure described above. Other computer architecture designs known in the art for processors and computing systems may also be used. Generally, suitable computer architectures for embodiments disclosed herein can include, but are not limited to, configurations illustrated in FIGS. 12-13.

FIG. 12 is an example illustration of a processor according to an embodiment. Processor 1200 is an example of a type of hardware device that can be used in connection with the implementations above. Processor 1200 may be any type of processor, such as a microprocessor, an embedded processor, a digital signal processor (DSP), a network processor, a multi-core processor, a single core processor, or other device to execute code. Although only one processor 1200 is illustrated in FIG. 12, a processing element may alternatively include more than one of processor 1200 illustrated in FIG. 12. Processor 1200 may be a single-threaded core or, for at least one embodiment, the processor 1200 may be multi-threaded in that it may include more than one hardware thread context (or "logical processor") per core.

FIG. 12 also illustrates a memory 1202 coupled to processor 1200 in accordance with an embodiment. Memory 1202 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1200 can execute any type of instructions associated with algorithms, processes, or operations detailed herein. Generally, processor 1200 can transform an element or an article (e.g., data) from one state or thing to another state or thing.

Code 1204, which may be one or more instructions to be executed by processor 1200, may be stored in memory 1202, or may be stored in software, hardware, firmware, or any suitable combination thereof, or in any other internal or external component, device, element, or object where appropriate and based on particular needs. In one example, processor 1200 can follow a program sequence of instructions indicated by code 1204. Each instruction enters a front-end logic 1206 and is processed by one or more decoders 1208. The decoder may generate, as its output, a micro operation such as a fixed width micro operation in a predefined format, or may generate other instructions, microinstructions, or control signals that reflect the original code instruction. Front-end logic 1206 also includes register renaming logic 1210 and scheduling logic 1212, which generally allocate resources and queue the operation corresponding to the instruction for execution.

Processor 1200 can also include execution logic 1214 having a set of execution units 1216a, 1216b, 1216n, etc. Some embodiments may include a number of execution units dedicated to specific functions or sets of functions. Other embodiments may include only one execution unit or one execution unit that can perform a particular function. Execution logic 1214 performs the operations specified by code instructions.

After completion of execution of the operations specified by the code instructions, back-end logic 1218 can retire the instructions of code 1204. In one embodiment, processor 1200 allows out of order execution but requires in order retirement of instructions. Retirement logic 1220 may take a variety of known forms (e.g., re-order buffers or the like). In this manner, processor 1200 is transformed during execution of code 1204, at least in terms of the output generated by the decoder, hardware registers and tables utilized by register renaming logic 1210, and any registers (not shown) modified by execution logic 1214.

Although not shown in FIG. 12, a processing element may include other elements on a chip with processor 1200. For example, a processing element may include memory control logic along with processor 1200. The processing element may include I/O control logic and/or may include I/O control logic integrated with memory control logic. The processing element may also include one or more caches. In some embodiments, non-volatile memory (such as flash memory or fuses) may also be included on the chip with processor 1200.

FIG. 13 illustrates a computing system 1300 that is arranged in a point-to-point (PtP) configuration according to an embodiment. In particular, FIG. 13 shows a system where processors, memory, and input/output devices are interconnected by a number of point-to-point interfaces. Generally, one or more of the computing systems described herein may be configured in the same or similar manner as computing system 1300.

Processors 1370 and 1380 may also each include integrated memory controller logic (MC) 1372 and 1382 to communicate with memory elements 1332 and 1334. In alternative embodiments, memory controller logic 1372 and 1382 may be discrete logic separate from processors 1370 and 1380. Memory elements 1332 and/or 1334 may store various data to be used by processors 1370 and 1380 in achieving operations and functionality outlined herein.

Processors 1370 and 1380 may be any type of processor, such as those discussed in connection with other figures. Processors 1370 and 1380 may exchange data via a point-to-point (PtP) interface 1350 using point-to-point interface circuits 1378 and 1388, respectively. Processors 1370 and 1380 may each exchange data with a chipset 1390 via individual point-to-point interfaces 1352 and 1354 using point-to-point interface circuits 1376, 1386, 1394, and 1398. Chipset 1390 may also exchange data with a co-processor 1338, such as a high-performance graphics circuit, machine learning accelerator, or other co-processor 1338, via an interface 1339, which could be a PtP interface circuit. In alternative embodiments, any or all of the PtP links illustrated in FIG. 13 could be implemented as a multi-drop bus rather than a PtP link.

Chipset 1390 may be in communication with a bus 1320 via an interface circuit 1396. Bus 1320 may have one or more devices that communicate over it, such as a bus bridge 1318 and I/O devices 1316. Via a bus 1310, bus bridge 1318 may be in communication with other devices such as a user interface 1312 (such as a keyboard, mouse, touchscreen, or other input devices), communication devices 1326 (such as modems, network interface devices, or other types of communication devices that may communicate through a computer network 1360), audio I/O devices 1316, and/or a data storage device 1328. Data storage device 1328 may store code 1330, which may be executed by processors 1370 and/or 1380. In alternative embodiments, any portions of the bus architectures could be implemented with one or more PtP links.

The computer system depicted in FIG. 13 is a schematic illustration of an embodiment of a computing system that may be utilized to implement various embodiments discussed herein. It will be appreciated that various components of the system depicted in FIG. 13 may be combined in a system-on-a-chip (SoC) architecture or in any other suitable configuration capable of achieving the functionality and features of examples and implementations provided herein.

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. It will be understood that certain examples may be combined with certain other examples, in certain embodiments.

Example 1 includes an apparatus comprising: controller circuitry to interface with a camera over an Inter-Integrated Circuit (I3C) bus; and frame processing circuitry to: process a message received from the camera over the I3C bus indicating image data is ready for transfer; cause a read message to be transmitted to the camera over the I3C bus based on the received message; and process a set of line payload packets received over the I3C bus based on the read message, the line payload packets comprising image data from the camera.

Example 2 includes the subject matter of Example 1, wherein the message indicating image data is ready for transfer is an In-Band Interrupt (IBI) signal.

Example 3 includes the subject matter of Example 1 or 2, wherein the read message comprises a Common Command Code (CCC) of 0xC0, a defining byte code of 0x01, and an address of the camera on the I3C bus.

Example 4 includes the subject matter of any one of Examples 1-3, wherein the frame processing circuitry is further to: cause a header request message to be transmitted to the camera over the I3C bus before the read command; and process a packet header received from the camera over the I3C bus based on the packet header request message.

Example 5 includes the subject matter of Example 4, wherein the header request message comprises a Common Command Code (CCC) of 0xC0, a defining byte code of 0x04, and an address of the camera on the I3C bus.

Example 6 includes the subject matter of any one of Examples 1-5, wherein the frame processing circuitry is to cause a read message to be transmitted for each line payload packet to be received.

Example 7 includes the subject matter of any one of Examples 1-6, wherein the frame processing circuitry is to cause a read message to be transmitted for a plurality of line payload packets to be received.

Example 8 includes the subject matter of any one of Examples 1-7, wherein the frame processing circuitry is to verify the image data using a cyclic redundancy check (CRC) value received over the I3C bus.

Example 9 includes the subject matter of any one of Examples 1-8, wherein the frame processing circuitry is further to, while processing line payload packets, cause a drop frame message to be transmitted to the camera over the I3C bus.

Example 10 includes the subject matter of Example 9, wherein the drop frame message comprises a Common Command Code (CCC) of 0xC0, a defining byte code of 0x02, and an address of the camera on the I3C bus.

Example 11 includes the subject matter of any one of Examples 1-10, wherein the frame processing circuitry is further to cause a frame demand message to be transmitted to the camera over the I3C bus, wherein the message received from the camera over the I3C bus indicating image data is ready for transfer is received based on the frame demand message.

Example 12 includes the subject matter of any one of Examples 1-11, further comprising controller circuitry to interface with the camera over a Camera Serial Interface 2 (CSI-2) bus.

Example 13 includes the subject matter of Example 12, further comprising: first image processing circuitry to receive image data received from the camera over the I3C bus and the CSI-2 bus; and second image processing circuitry to receive image data received from the camera over the I3C bus.

Example 14 includes a method comprising: receiving, at a system-on-chip (SoC) of a computing device, a message from a camera over an Inter-Integrated Circuit (I3C) bus indicating image data is ready for transfer; transmitting a read message to the camera over the I3C bus based on the received message; receiving a set of line payload packets over the I3C bus based on the transmitted read message, the line payload packets comprising image data from the camera; generating image pixel interface (IPI) data from the line payload packets; and processing the IPI data at the SoC.

Example 15 includes the subject matter of Example 14, further comprising: transmitting a header request message to the camera over the I3C bus before the read command; and receiving a packet header from the camera over the I3C bus based on the packet header request message.

Example 16 includes the subject matter of any one of Examples 14-15, further comprising: receiving a cyclic redundancy check (CRC) value from the camera over the I3C bus after the line payload packets; and verifying the image data, by the SoC, using the CRC value.

Example 17 includes the subject matter of any one of Examples 14-16, further comprising transmitting a frame demand message to the camera over the I3C bus, wherein the message received from the camera over the I3C bus indicating image data is ready for transfer is received based on the frame demand message.

Example 18 includes a system comprising: a host system-on-chip (SoC) comprising vision processing circuitry; and a camera connected to the host SoC through an Inter-Integrated Circuit (I3C) bus, the camera comprising circuitry to generate image data and transmit an interrupt signal to the host SoC over the I3C bus indicating the image data is ready for transfer; wherein the host SoC vision processing circuitry is to: transmit a read message to the camera over the I3C bus based on the interrupt signal; and receive a set of line payload packets over the I3C bus based on the read message, the line payload packets comprising the image data.

Example 19 includes the subject matter of Example 18, wherein the host SoC vision processing circuitry is further to: transmit a header request message to the camera over the I3C bus before the read command; and receive a packet header from the camera over the I3C bus based on the packet header request message.

Example 20 includes the subject matter of any one of Examples 18-19, wherein the host SoC vision processing circuitry is to verify the image data using a cyclic redundancy check (CRC) value received over the I3C bus.

Example 21 includes the subject matter of any one of Examples 18-20, wherein the host SoC further comprises circuitry to receive image data from the camera over a Camera Serial Interface 2 (CSI-2) bus.

Example 22 includes the subject matter of any one of Examples 18-21, wherein the system comprises a laptop computer system, the host SoC being in a base of the laptop computer system and the camera being in a lid of the laptop computer system.

Example 23 includes a system comprising means to perform the method of any one of Examples 14-17.

Example 24 includes one or more computer-readable media comprising instruction that cause a machine to implement the method of any one of Examples 14-17.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An apparatus comprising:
controller circuitry to interface with a camera over an Inter-Integrated Circuit (I3C) bus; and
frame processing circuitry to:
obtain a signal from the camera over the I3C bus, the signal to indicate image data is ready for transfer;
cause a first message to be transmitted to the camera over the I3C bus after receipt of the signal, the first message including a private common command code (CCC) and a first value, the first value to indicate the camera is to provide an image frame header;
cause a second message to be transmitted to the camera over the I3C bus after receipt of the image frame header, the second message including the private CCC and a second value different from the first value, the second value to indicate the camera is to provide image payload data; and
process a set of one or more line payload packets over the I3C bus after transmission of the second message, the set of line payload packets including the image payload data from the camera.

2. The apparatus of claim 1, wherein the signal is an In-Band Interrupt (IBI) signal.

3. The apparatus of claim 1, wherein the private CCC is 0xC0, the second value is a defining byte code of 0x01, and the second message includes an address of the camera on the I3C bus.

4. The apparatus of claim 1, wherein the private CCC is 0xC0, the first value is a defining byte code of 0x04, and the first message includes an address of the camera on the I3C bus.

5. The apparatus of claim 1, wherein the second message is one or a plurality of second messages, and the frame processing circuitry is to cause respective ones of the second message to be transmitted before receipt of corresponding ones of the line payload packets.

6. The apparatus of claim 1, wherein the frame processing circuitry is to cause the second message to be transmitted before receipt of a plurality of the line payload packets.

7. The apparatus of claim 1, wherein the frame processing circuitry is to verify the image payload data based on a cyclic redundancy check (CRC) value received over the I3C bus.

8. The apparatus of claim 1, wherein the frame processing circuitry is to, while the line payload packets are processed, cause a drop frame message to be transmitted to the camera over the I3C bus.

9. The apparatus of claim 8, wherein the private CCC is a first private CCC, and the drop frame message includes a second the private CCC of 0xC0, a defining byte code of 0x02, and an address of the camera on the I3C bus.

10. The apparatus of claim 1, wherein the frame processing circuitry is to cause a frame demand message to be transmitted to the camera over the I3C bus before receipt of the signal.

11. The apparatus of claim 1, including controller circuitry to interface with the camera over a Camera Serial Interface 2 (CSI-2) bus.

12. The apparatus of claim 11, including:

first image processing circuitry to obtain first image data from the camera over the I3C bus and the CSI-2 bus; and second image processing circuitry to obtain second image data from the camera over the I3C bus.

13. A method comprising:

receiving, at a system-on-chip (SoC) of a computing device, a signal from a camera over an Inter-Integrated Circuit (I3C) bus, the signal indicating image data is ready for transfer;

transmitting a first message to the camera over the I3C bus after receipt of the signal, the first message including a private common command code (CCC) and a first value, the first value to indicate the camera is to provide an image frame header;

transmitting a second message to the camera over the I3C bus after receipt of the image frame header, the second message including the private CCC and a second value different from the first value, the second value to indicate the camera is to provide image payload data;

receiving one or more line payload packets over the I3C bus after transmission of the second message, the one or more line payload packets including the image payload data from the camera;

generating image pixel interface (IPI) data based on the line payload packets; and processing the IPI data at the SoC.

14. The method of claim 13, including:

receiving a cyclic redundancy check (CRC) value from the camera over the I3C bus after the one or more line payload packets; and verifying the image payload data based on the CRC value.

15. The method of claim 13, including transmitting a frame demand message to the camera over the I3C bus before receipt of the signal.

16. A system comprising:

a host system-on-chip (SoC) including vision processing circuitry; and a camera connected to the host SoC through an Inter-Integrated Circuit (I3C) bus, the camera including first circuitry to generate image data and transmit an interrupt signal to the host SoC over the I3C bus, the interrupt signal to indicate the image data is ready for transfer;

wherein the host SoC vision processing circuitry is to:

cause transmission of a first message to the camera over the I3C bus after receipt of the interrupt signal, the first message including a private common command code (CCC) and a first value, the first value to indicate the camera is to provide an image frame header;

cause a second message to be transmitted to the camera over the I3C bus after receipt of the image frame header, the second message including the private CCC and a second value different from the first value, the second value to indicate the camera is to provide image payload data; and cause receipt of a set of one or more line payload packets over the I3C bus after the transmission of the second message, the set of line payload packets including the image payload data.

17. The system of claim 16, wherein the host SoC vision processing circuitry is to verify the image payload data based on a cyclic redundancy check (CRC) value from the I3C bus.

18. The system of claim 16, wherein the host SoC includes second circuitry to obtain second image data from the camera over a Camera Serial Interface 2 (CSI-2) bus.

19. The system of claim 16, wherein the system includes a laptop computer system, the host SoC is in a base of the laptop computer system and the camera is in a lid of the laptop computer system.

20. The apparatus of claim 10, wherein the frame demand message includes the private CCC, a third value to define the frame demand message, and an address of the camera on the I3C bus, the third value different from the first value and the second value.

21. The method of claim 15, wherein the frame demand message includes the private CCC, a third value to define the frame demand message, and an address of the camera on the I3C bus, the third value different from the first value and the second value.

22. The system of claim 16, wherein the host SoC vision processing circuitry is to cause a frame demand message to be transmitted to the camera over the I3C bus before receipt of the interrupt signal, the frame demand message including the private CCC, a third value to define the frame demand message, and an address of the camera on the I3C bus, the third value different from the first value and the second value.

* * * * *